US010462630B2

(12) United States Patent
Nicholson et al.

(10) Patent No.: US 10,462,630 B2
(45) Date of Patent: Oct. 29, 2019

(54) NETWORK-BASED MACHINE-TO-MACHINE (M2M) PRIVATE NETWORKING SYSTEM

(71) Applicant: CyberReef Solutions Inc., Shreveport, LA (US)

(72) Inventors: Hilton Nicholson, Haughton, LA (US); Jamie Richmond Brown, III, Liberty Hill, TX (US); William Pace, Greensboro, NC (US); Linwood Staton, Kernersville, NC (US); Christopher Landman, Bossier, LA (US); Bryce Reeves, Pleasant Hill, MO (US)

(73) Assignee: CyberReef Solutions Inc., Shreveport, LA (US)

( * ) Notice: Subject to any disclaimer, the term of this patent is extended or adjusted under 35 U.S.C. 154(b) by 0 days.

(21) Appl. No.: 15/936,929

(22) Filed: Mar. 27, 2018

(65) Prior Publication Data

US 2018/0220285 A1    Aug. 2, 2018

Related U.S. Application Data

(62) Division of application No. 15/153,287, filed on May 12, 2016.
(Continued)

(51) Int. Cl.
*H04L 29/00* (2006.01)
*H04W 4/70* (2018.01)
(Continued)

(52) U.S. Cl.
CPC ........... *H04W 4/70* (2018.02); *H04L 12/4633* (2013.01); *H04L 12/4641* (2013.01);
(Continued)

(58) Field of Classification Search
CPC ..... H04L 63/20; H04L 63/102; H04L 63/029; H04L 12/4641; H04L 12/4633;
(Continued)

(56) References Cited

U.S. PATENT DOCUMENTS 6,339,595 B1 * 1/2002 Rekhter .............. H04L 12/4645
370/392
7,634,230 B2   12/2009 Ji et al.
(Continued)

FOREIGN PATENT DOCUMENTS

EP      2879344 A1    6/2015
WO   2012/178055 A1   12/2012
WO   2014/064232 A1    5/2014

OTHER PUBLICATIONS

Office action dated Feb. 2, 2018 in co-pending U.S. Appl. No. 15/153,287.
(Continued)

*Primary Examiner* — Don G Zhao
(74) *Attorney, Agent, or Firm* — Nields, Lemack & Frame, LLC

(57) ABSTRACT

An architecture for the creation of a private network for a customer, suitable for use for machine to machine communications and the Internet of Things, is disclosed. The system includes a private networking system, which includes routers for connection to a carrier core network, and VPN servers, capable of securely connecting to a customer's enterprise network. The private networking system also includes security appliances and a controller to configure and operate the system. Through use of this private networking system, customers may easily create private networks for their enterprises.

16 Claims, 11 Drawing Sheets

Related U.S. Application Data

(60) Provisional application No. 62/160,964, filed on May 13, 2015.

(51) Int. Cl.
  *H04L 12/46* (2006.01)
  *H04L 29/06* (2006.01)

(52) U.S. Cl.
  CPC ...... *H04L 63/0236* (2013.01); *H04L 63/0272* (2013.01); *H04L 63/102* (2013.01); *H04L 63/20* (2013.01)

(58) Field of Classification Search
  CPC ........... H04L 63/0272; H04L 63/0236; H04W 4/005; H04W 4/70
  See application file for complete search history.

(56) References Cited

U.S. PATENT DOCUMENTS

| | | | |
|---|---|---|---|
| 7,810,149 B2 | 10/2010 | Islam et al. | |
| 7,826,381 B1* | 11/2010 | Kastuar | H04L 12/4641 370/242 |
| 7,849,217 B2 | 12/2010 | Meier | |
| 7,882,247 B2 | 2/2011 | Sturniolo et al. | |
| 8,316,152 B2 | 11/2012 | Geltner et al. | |
| 8,837,318 B2 | 9/2014 | Anthony et al. | |
| 8,855,012 B1 | 10/2014 | Suri | |
| 8,918,503 B2 | 12/2014 | Luna | |
| 8,934,414 B2 | 1/2015 | Luna | |
| 8,953,446 B1* | 2/2015 | Wang | H04L 12/4641 370/231 |
| 8,976,963 B2 | 3/2015 | Islam et al. | |
| 9,014,023 B2 | 4/2015 | Anthony et al. | |
| 9,059,941 B1 | 6/2015 | Oweis et al. | |
| 9,179,447 B2 | 11/2015 | Holm et al. | |
| 9,198,021 B2 | 11/2015 | Tomici et al. | |
| 9,621,460 B2* | 4/2017 | Mehta | H04L 45/74 |
| 9,973,489 B2* | 5/2018 | Barton | H04W 12/08 |
| 2002/0099826 A1* | 7/2002 | Summers | H04L 12/4679 709/227 |
| 2004/0037260 A1* | 2/2004 | Kakemizu | H04L 12/4641 370/338 |
| 2004/0208175 A1* | 10/2004 | McCabe | H04L 45/04 370/389 |
| 2005/0089015 A1* | 4/2005 | Tsuge | H04L 45/04 370/351 |
| 2005/0237982 A1* | 10/2005 | Pankajakshan | H04L 12/5692 370/338 |
| 2005/0249218 A1 | 11/2005 | Biggs et al. | |
| 2008/0037498 A1* | 2/2008 | Narayanan | H04W 28/06 370/342 |
| 2008/0101366 A1* | 5/2008 | Venkitaraman | H04L 12/4633 370/392 |
| 2010/0033573 A1* | 2/2010 | Malinovski | G08B 13/19656 348/158 |
| 2010/0097981 A1* | 4/2010 | Kant | H04L 63/102 370/328 |
| 2010/0111049 A1* | 5/2010 | Siegel | H04L 29/12188 370/336 |
| 2010/0296414 A1* | 11/2010 | Vohra | H04L 12/4633 370/254 |
| 2010/0318918 A1* | 12/2010 | Mahmoodshahi | H04L 41/5051 715/744 |
| 2012/0002813 A1* | 1/2012 | Wei | H04L 63/0272 380/270 |
| 2012/0005476 A1* | 1/2012 | Wei | H04L 63/0272 713/153 |
| 2012/0005477 A1* | 1/2012 | Wei | H04L 63/0272 713/153 |
| 2012/0005746 A1* | 1/2012 | Wei | H04L 63/0272 726/15 |
| 2012/0246325 A1* | 9/2012 | Pancorbo Marcos | H04L 63/102 709/227 |
| 2012/0250516 A1* | 10/2012 | Aggarwal | H04L 45/22 370/238 |
| 2013/0054763 A1* | 2/2013 | Van der Merwe | H04W 8/12 709/220 |
| 2013/0238816 A1 | 9/2013 | Skog | |
| 2014/0165134 A1* | 6/2014 | Goldschlag | G06F 21/60 726/1 |
| 2014/0269564 A1* | 9/2014 | Tie | H04W 76/12 370/329 |
| 2014/0286237 A1 | 9/2014 | Bhalla | |
| 2014/0317276 A1* | 10/2014 | Tie | H04L 45/306 709/224 |
| 2014/0359704 A1 | 12/2014 | Chen | |
| 2014/0364159 A1 | 12/2014 | Murray et al. | |
| 2015/0098334 A1 | 4/2015 | Luna | |
| 2015/0128205 A1 | 5/2015 | Mahaffey et al. | |
| 2015/0163213 A1 | 6/2015 | Chen | |
| 2015/0188949 A1* | 7/2015 | Mahaffey | H04L 63/20 726/1 |
| 2015/0195270 A1 | 7/2015 | Chen | |
| 2015/0249642 A1 | 9/2015 | Burns et al. | |
| 2015/0249672 A1* | 9/2015 | Burns | H04L 12/66 726/4 |
| 2015/0263886 A1 | 9/2015 | Wang et al. | |
| 2015/0288678 A1 | 10/2015 | Chen | |
| 2015/0365278 A1* | 12/2015 | Chakrabarti | H04L 41/0806 370/254 |
| 2016/0006815 A1* | 1/2016 | Dong | G06F 9/46 709/204 |
| 2016/0006837 A1* | 1/2016 | Reynolds | H04W 84/18 709/203 |
| 2016/0007193 A1 | 1/2016 | Zhang | |
| 2016/0014154 A1* | 1/2016 | Huang | H04L 63/20 726/1 |
| 2016/0066186 A1* | 3/2016 | Kim | H04W 12/08 455/406 |
| 2016/0087933 A1 | 3/2016 | Johnson et al. | |
| 2016/0164728 A1* | 6/2016 | Chakrabarti | H04L 63/029 370/254 |
| 2016/0278147 A1* | 9/2016 | Adrangi | H04W 4/70 |
| 2016/0337784 A1 | 11/2016 | Nicholson et al. | |
| 2016/0352682 A1* | 12/2016 | Chang | H04L 61/6022 |
| 2016/0380823 A1* | 12/2016 | Shen | H04L 12/4675 370/254 |
| 2017/0019750 A1* | 1/2017 | Palanisamy | H04W 28/0289 |
| 2018/0152541 A1* | 5/2018 | Mathison | H04W 4/70 |

OTHER PUBLICATIONS

Office action dated Jul. 2, 2018 in co-pending U.S. Appl. No. 15/153,287.

Notice of allowance dated Jul. 8, 2019 in co-pending U.S. Appl. No. 15/153,287.

Final rejection dated Jan. 16, 2019 in co-pending U.S. Appl. No. 15/153,287.

* cited by examiner

NETWORK-BASED MACHINE-TO-MACHINE (M2M) PRIVATE NETWORKING SYSTEM

This application is a divisional of U.S. patent application Ser. No. 15/153,287, filed May 12, 2016 and claims priority of U.S. Provisional Patent Application 62/160,964, filed May 13, 2015, the disclosures of which are incorporated by reference in their entireties.

FIELD

Embodiments of the present disclosure relate to network system, and more particularly, to a secure private networking system and methods of using the private networking system.

BACKGROUND

Today, if Machine-to-Machine (M2M) and Internet of Things (IoT) customers want secure mobile terminated access to remote cellular modems, these customers are required to purchase hardware and Virtual Private Networking (VPN) licenses, and lease T1 lines or MPLS circuits along with specialized software to access these modems on the cellular carrier's network.

FIG. 1 shows a typical architecture. The system involves the customer enterprise network 10. This customer enterprise network 10 is made up of the customer's hardware, such as servers, desktops, storage arrays and the like. To connect securely to the internet, the customer enterprise network 10 may be connected to a carrier network 30, through one or more dedicated communications links 20.

These dedicated communications links 20 may be one or more T1 lines or MPLS Circuits, typically acquired or leased from a communications carrier. In other embodiments, the communication links 20 may be metro-Ethernet connections, Multi-Protocol Label Switching (MPLS), or another fast speed connection. The communications carrier may be a telephone or communications company, such as AT&T or Verizon, among others.

Within the carrier network 30, a private customer subnet 40 may be established. Remote users and machines connect to the customer enterprise network 10 through the use of specialized networking software, such as virtual private networks (VPNs). These VPNs may be terminated on the carrier network 30.

Typically, to implement this architecture, the customer is required to invest in additional hardware, such as routers 11, to connect to BGP AS (Border Gateway Protocol—Autonomous Systems) routers 31 in the carrier network 30. The customer is also required to obtain VPN licenses and to lease the communications links 20. Additionally, it often requires dedicated labor, in the form of consultants, for the customer to attain the desired architecture. Finally, it may take many months to deploy this architecture.

The current method is complex, slow, and costly. Therefore, it would be beneficial if there were a system for creating a private network without the associated costs and complexities and with the speed to match the business needs of the end customer.

SUMMARY

An architecture for the creation of a private network for a customer, suitable for use for machine to machine communications and the Internet of Things, is disclosed. The system includes a private networking system, which includes routers for connection to a carrier core network, and VPN servers, capable of securely connecting to a customer's enterprise network, along with firewalls to generate SSL and IPsec tunnels. The private networking system also includes security appliances and a controller to configure and operate the system. Through use of this private networking system, customers may quickly and easily create private networks for their enterprises with a much less expensive operating cost paradigm.

BRIEF DESCRIPTION OF THE FIGURES

For a better understanding of the present disclosure, reference is made to the accompanying drawings, which are incorporated herein by reference and in which.

DETAILED DESCRIPTION

As described above, typically, a customer needs to invest in networking infrastructure, such as routers, ASAs (Adaptive Security Appliances), and servers, to implement a private network. In addition, the carrier needs to deploy that private network in their carrier network.

Figure 1:
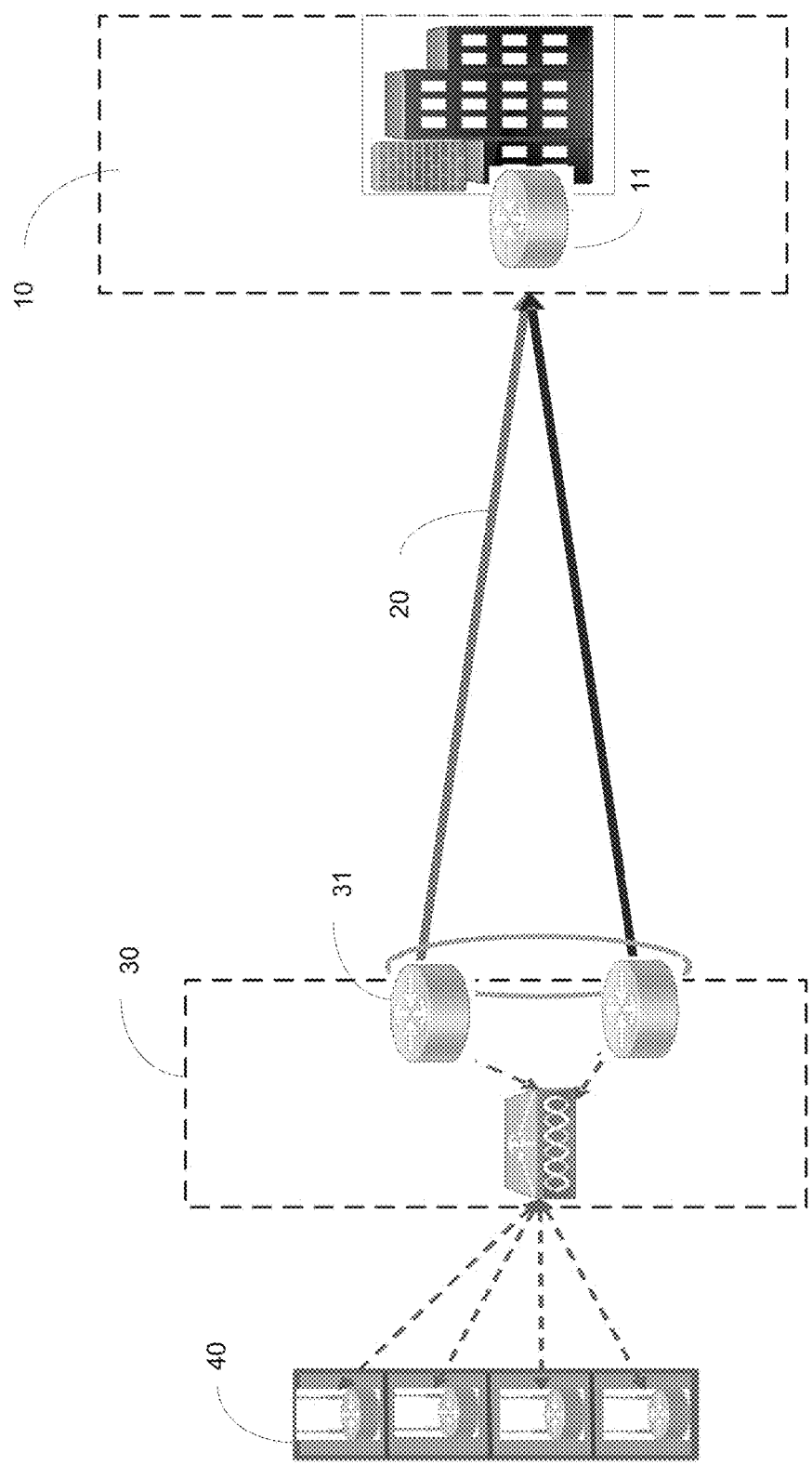
FIG. 1 shows a private network architecture according to the prior art.
Figure 2:
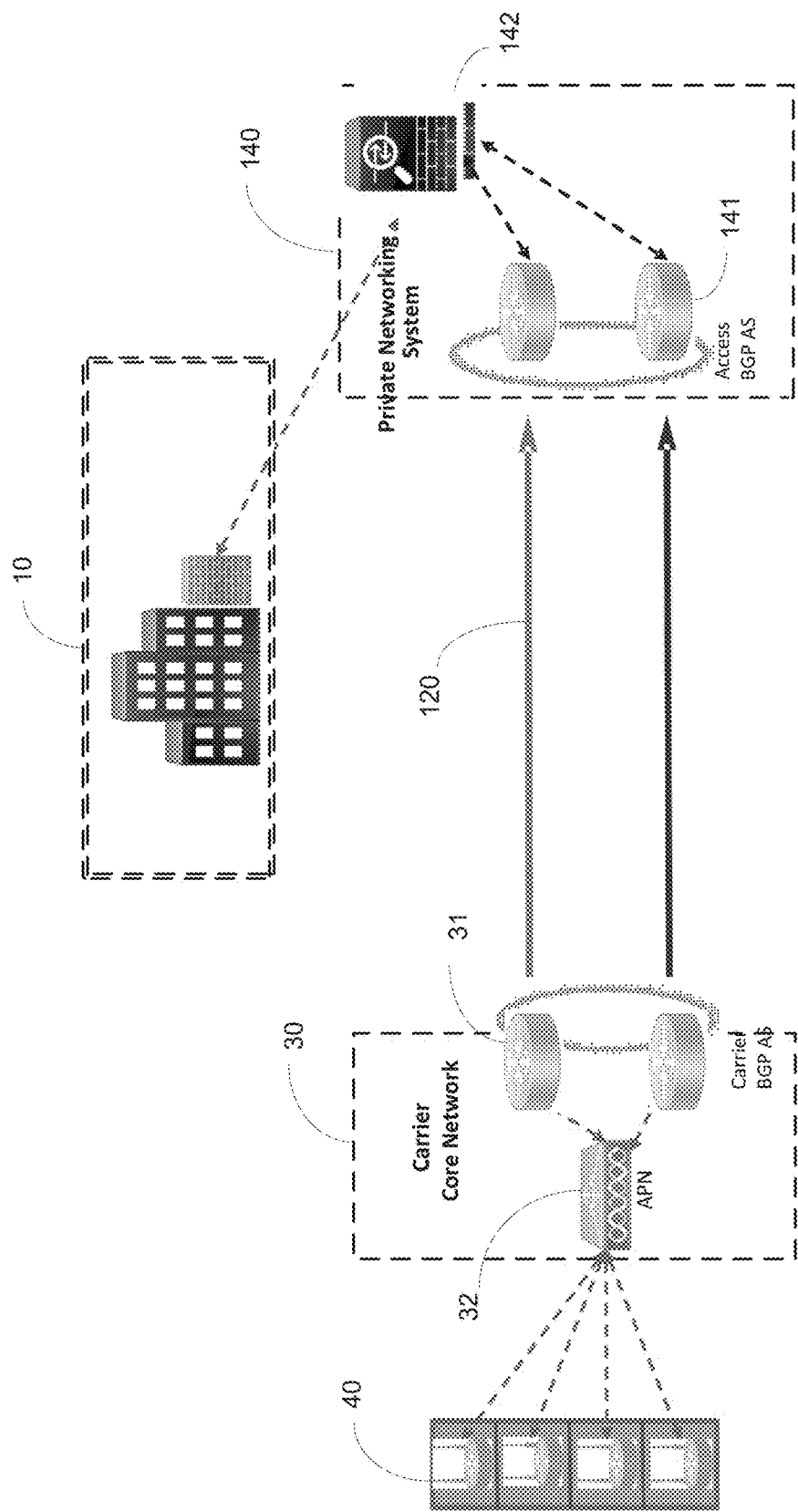
FIG. 2 contrasts the present embodiment to the architecture shown in FIG. 1.

The present disclosure describes a system which dramatically simplifies the deployment of a private network. FIG. 2 shows an embodiment of this system. In this system, the carrier network 30 is unchanged, and still includes one or more BGP AS routers 31 and one or more gateways 32. As in FIG. 1, a private customer subnet 40 is established within the carrier network 30. In certain embodiments, the private customer subnet may be a set of IP addresses that are assigned to that particular customer. In some embodiments, the set of IP addresses may be contiguous, although this is not a requirement. In some embodiments, the IP addresses may be static. In certain embodiments, the IP addresses may be private static IP addresses. Remote users connect to the customer enterprise network 10 through the use of specialized networking software, such as encrypted tunnels. More specifically, a first tunnel is created between the carrier network 30 and the private networking system 140. This first tunnel may be a GRE/IPSec tunnel, as is typically used in carrier communications, although other protocols may be used. Thus, traffic travelling over communication links 120 is encapsulated in the first tunnel. The private networking system 140 then creates a second tunnel, which extends from the private networking system 140 to the customer enterprise network 10. This second tunnel may be a VPN, which may use SSL or IPSec for security.

However, unlike the prior art, the communications links from the carrier network 30 do not reach the customer enterprise network 10. Rather, these communication links 120 are used to connect to routers 141, such as BPG routers, disposed within the private networking system 140. Thus, rather than installing communication links to the customer enterprise network 10, the communication links 120 are established between the carrier network 30 and the private networking system 140. As stated above, communication between the carrier network 30 and the routers 141, travelling over communication link 120 is encrypted using a first tunnel, such as GRE/IPSec. Also included in the private networking system 140 are one or more VPN servers 142. These VPN servers 142 are used to provide secure connections to the customer enterprise network 10. In certain embodiments, these secure connections are created using other types of equipment, such as firewalls. In other words, a secure connection between the private networking system 140 and the customer enterprise network is created. The particular apparatus used to create this secure connection is an implementation choice. Thus, the VPN servers 142 are used to create a second tunnel between the private networking system 140 and the customer enterprise network 10. Again, the term "VPN server" is used to denote any appliance that is capable of creating a secure connection, such as a VPN between the private networking system 140 and the customer enterprise network 10. Further, the private networking system 140 may include one or more security appliances. In certain embodiments, the private networking system 140 is installed in the carrier network 30, although other embodiments are also possible. For example, the private networking system 140 may be disposed at any physical location and accessible via the cloud.

Figure 3A:
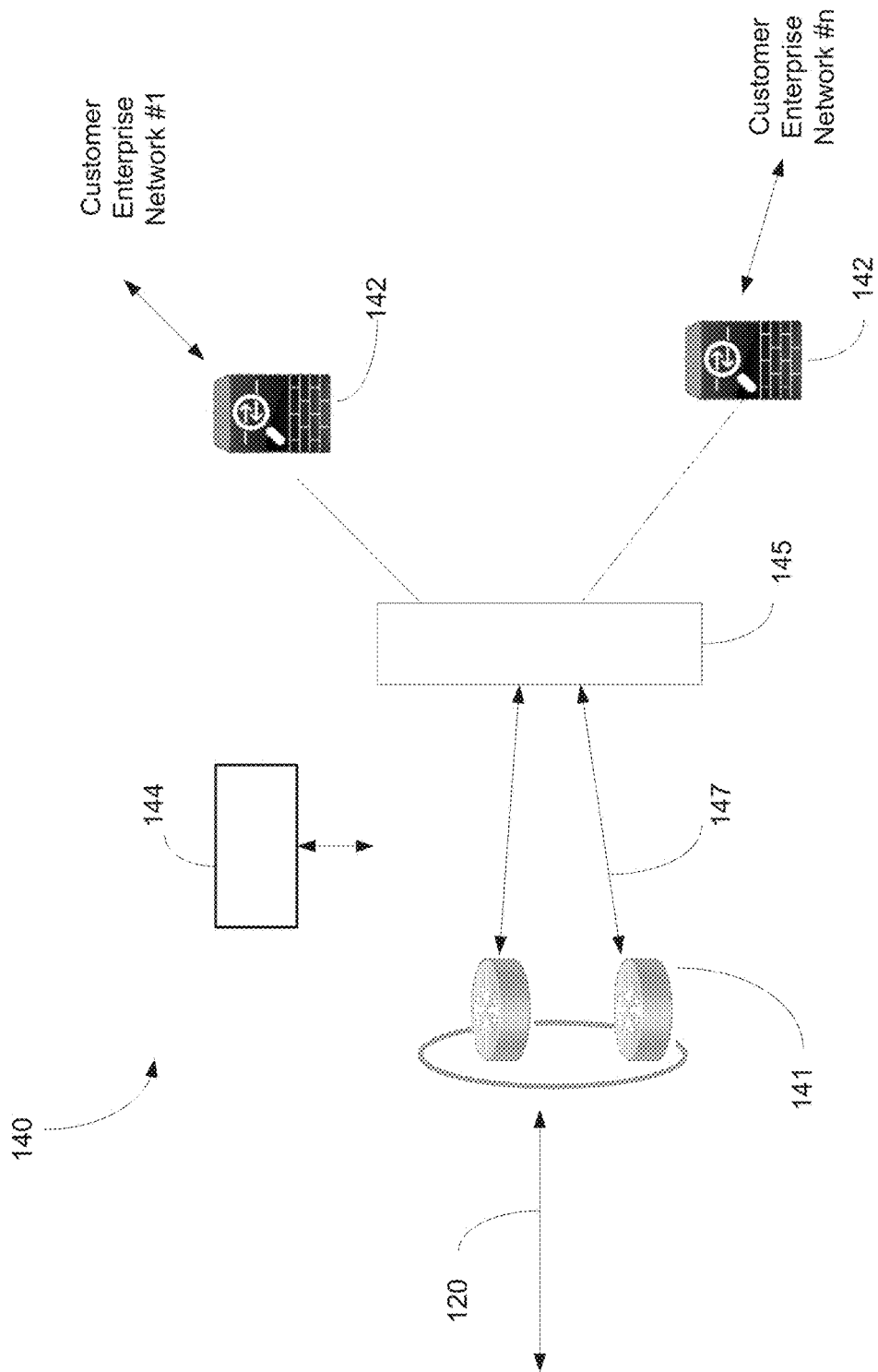
FIG. 3A shows the flow of date through the private networking system.

FIG. 3A shows a diagram showing the flow of data through the private networking system 140. As described above, it includes one or more routers 141, which may be BPG routers, that are used to communicate with the carrier network 30. In certain embodiments, multiple routers 141 may be used to provide redundancy, higher availability or increased throughput. In other embodiments, one router 141 is used. Additionally, the private networking system 140 includes one or more VPN servers 142, which are used to provide secure connections to one or more customer enterprise networks 10. The routers 141 and the VPN servers 142 may be connected using a backbone switch or other networking component 145. Control logic 144 is used to control the flow of data through the private networking system 140. While FIG. 3A shows the control logic 144 as a separate component, it is also understood that this control logic 144 may exist in the routers 141, the VPN servers 142, or both. In operation, communications, which are encrypted using the first tunnel, arrive at the router 141 via communications link 120. Devices which are authorized to interact with the private networking system 140 are given a specific IP address which identifies the devices as part of the customer's network. This IP address identifies the customer subnet 40 to which the device belongs. Devices which are authorized to interact with the private networking system 140 are also given an APN (Access Point Name) to use, as well as the IP address of the router 141.

Thus, an authorized device may send a communication using the carrier network 30. Based on the IP address of the authorized device and the APN, that communication is sent to a specific gateway 32 (see FIG. 2). That communication is encrypted using the first tunnel, and arrives at the router 141 in the private networking system 140. The router 141 is used to terminate the first tunnel, so that communications exiting the router via link 147 may not be encrypted. The router 141 may also examine the communications being directed toward the router 141, examining the IP address of the sending device, the type of activity being performed by that device, the APN, the ultimate destination IP address, etc. In certain embodiments, the router 141 forwards the communication to the VPN servers 142 to be sent onto a customer enterprise network 10. A backbone switch or other networking component 145 may be used to route the communications between the routers 141 and the VPN servers 142. Based on the IP address of the sending device, the control logic 144 can determine which customer enterprise network 10 the sending device belongs to. The communication from the sending device is then routed to one of the VPN servers 142, where it is encrypted in a second tunnel, such as a VPN. This secure communication is then routed to the appropriate customer enterprise network 10. The second tunnel is terminated at the customer enterprise network 10.

Thus, the private networking system 140 performs several functions. First, it terminates the first tunnel, which is created in the carrier network 30. Second, it validates the sending device to insure that it is authorized to access a particular customer enterprise network 10. Third, it creates a secure connection, or second tunnel, between the private networking system 140 and each customer enterprise network 10.

The private networking system 140 may also perform other functions. For example, the private networking system 140 may also track statistics for each device that is part of a particular customer enterprise network 10. For example, one such statistic is usage, such as the amount of data used. The private networking system 140 may also limit, prioritize or block certain activities. For example, the customer may wish to deprioritize or block certain activities on its network, such as video or movie playback, iTunes backup or other applications. Further, a customer may wish to limit its total data usage and its peak data usage. This may be done through the use of various policy decisions, which prioritize or deprioritize certain applications, users, and devices.

Figure 3B:
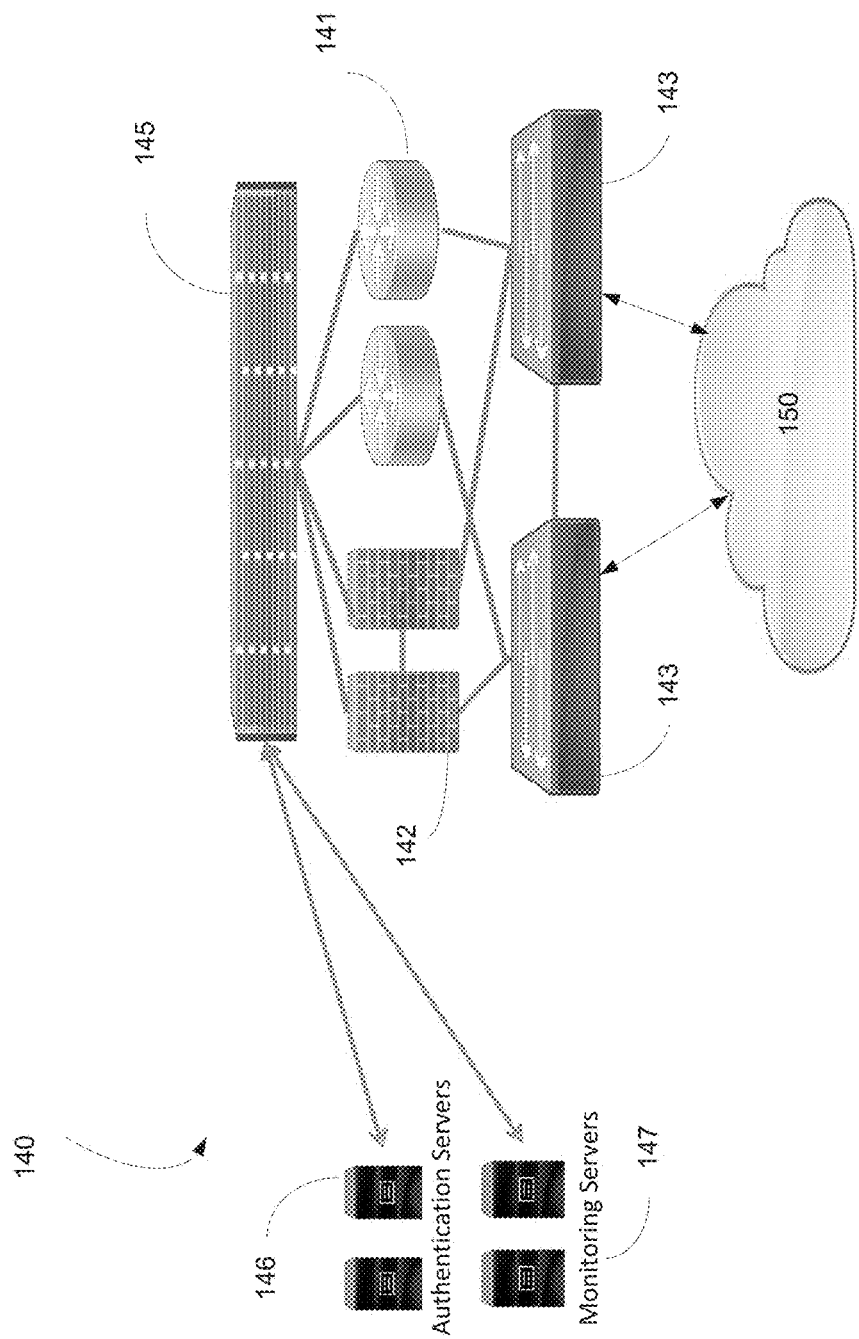
FIG. 3B shows a block diagram of the private networking system according to one embodiment.

FIG. 3B shows a block diagram of the private networking system 140 according to one embodiment. As described above, the private networking system 140 has one or more routers 141, which may be BPG routers. These routers 141 may be connected to switches 143 on one interface, and a backbone switch 145 on a second interface. The switches 144 may be in communication with the internet 150. In certain embodiments, the private networking system 140 may have multiple connections to the internet, such as via several internet service providers. The private networking system 140 also has security appliances, which also serve as VPN servers 142. Like the routers 141, the VPN servers 142 are also in communication with switches 143 and backbone switch 145. Communications enter the private networking system 140 from the internet 150 via switch 143. These communications enter the router 141, which terminates the first tunnel, and routes them appropriately. Communications destined for the customer enterprise network 10 are passed to the backbone switch 145 and forwarded to the VPN server 142. The VPN server 142 creates a second tunnel and forwards the communications to the customer enterprise network 10 through the switch 143, via the internet 150. As stated above, the private networking system 140 includes security appliances, which are used to implement the required security and firewall protocols. In certain embodiments, the security appliances may be firewalls which also serve as the VPN server 142. These firewalls may communicate with authentication servers 146 and monitoring servers 147 disposed in the private networking system 140 to control access to the private customer subnet 40. Protocols, such as but not limited to LDAPS, RADIUS, TACACS and others, may be used to control access to the private customer subnet 40 disposed in the carrier network 30. Further, the private networking system 140 may include control logic 144, such as a server, PC, an embedded processor or other device. The control logic 144 may be responsible for implementing the protocols and algorithms needed to create this system. In some embodiments, the control logic is embedded in the router 141 and/or the VPN server 142. The control logic 144 may be accessed remotely, such as via a dedicated IP address. The specific rules, policies and other controls may be entered into the control logic 144 remotely. Note that communication links 120 shown in FIG. 3A are actually connections to the private networking system 140, which may be traditional internet connections.

Figure 4:
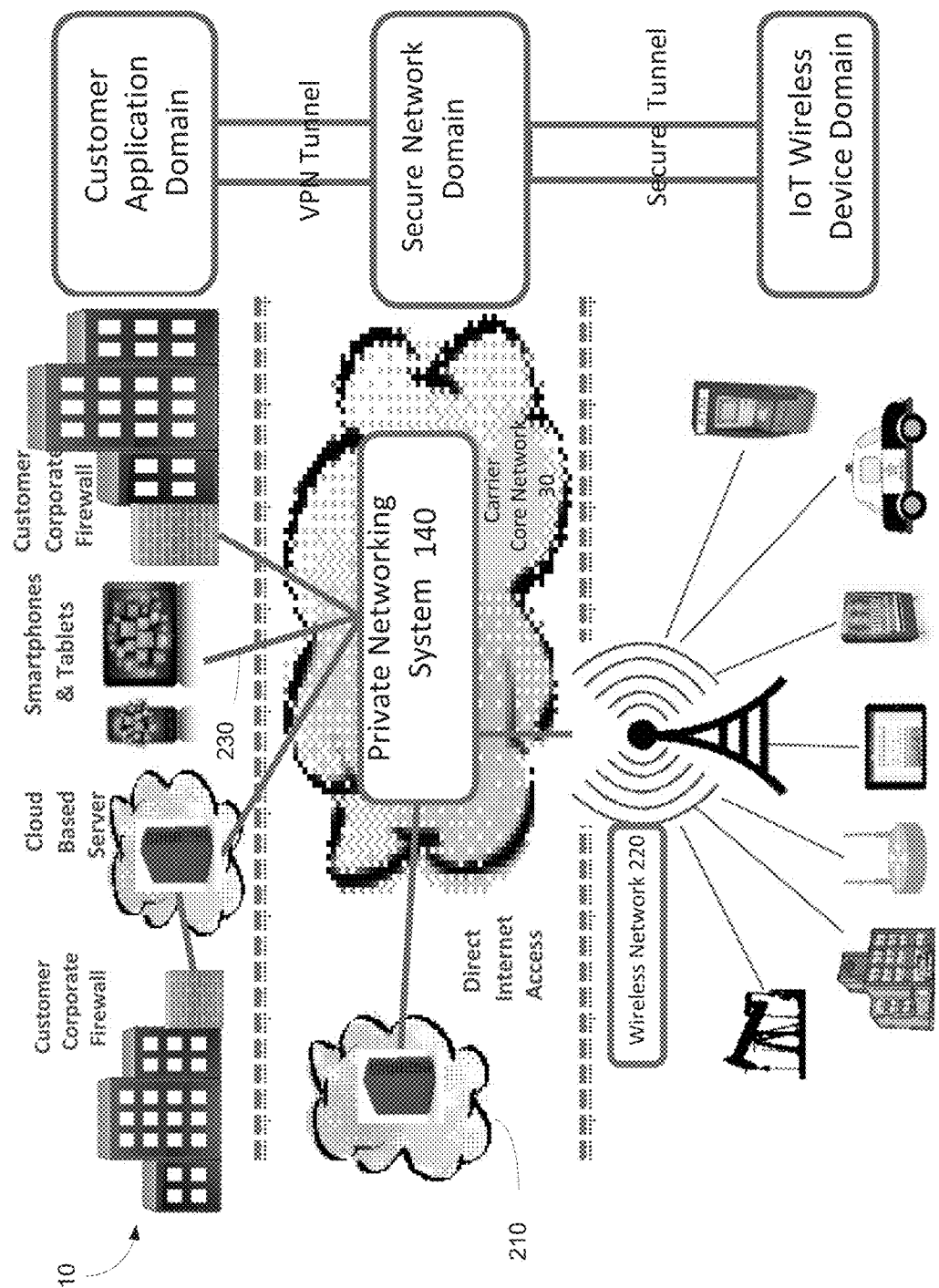
FIG. 4 shows the segmentation of the network architecture according to one embodiment.

FIG. 4 shows a different view of the present system and its location within an overall system architecture. In this figure, the private networking system 140 is shown as being disposed within the carrier network 30. However, as described above, the private networking system 140 may be disposed elsewhere and may be accessible to the carrier network 30 via the internet or a dedicated connection. The private networking system 140 is disposed between the carrier network 30 and the customer enterprise network 10. The carrier network 30 includes the private customer subnet, as well as access to the internet 210. The carrier core network 30 may be connected to the customer in two ways. First, the carrier may have a wireless network 220. The wireless network 220 connects to the carrier network 30 using techniques known in the art. For secure wireless transmissions, security algorithms may be used. The connection between the carrier's wireless network equipment and the carrier network 30 may, in certain embodiments, be a secure connection, such as an IPSec tunnel, a SSL tunnel, or other protocols. As described above, this secure connection, which is referred to as the first tunnel, is terminated at the routers 141 in the private networking system 140.

The carrier network 30 is also in communication with the private networking system 140, which connects to the customer enterprise network 10 via communication links 230. In certain embodiments, VPN tunnels, also referred to as second tunnels, are created over these communication links 230. These tunnels may use, for example, IPSec or SSL, to create the required level of security. Of course, other security protocols may be used to create the communication between the private networking system 140 and the customer enterprise network 10. The communication links 230 may not be dedicated lines, such as is illustrated in FIG. 4. Rather, the communication links 230 may be the internet connection between the private networking system 140 and the customer enterprise network 10.

Although not shown in FIG. 4, the private networking system 140 may be connected to the carrier core network 30 using the interface shown in FIG. 2. In other words, routers, such as BGP routers, may be used to connect the private networking system 140 to the carrier core network 30.

The architecture illustrated in FIG. 4 greatly simplifies the process required for a customer to configure a private subnet. As described earlier, rather than having the customer enterprise network 10 connect directly to the carrier core network 30, a private networking system 140 is disposed between the customer enterprise network 10 and the carrier core network 10. The private networking system 140 provides a straightforward and easy-to-configure interface to the customer enterprise network 10. In fact, the interface between the customer enterprise network 10 and the private networking system 140 may be created over existing communication links, such as fiber optics, cable, metro-Ethernet or the like. In certain embodiments, this interface may be created using VPN over the internet connection.

Stated differently, the private networking system 140 creates the connection to the carrier network 30 on behalf of many customers. The private networking system 140 also reserves a large number of IP addresses, which may be private static IP address, and are then divided among the various customers. In other words, traffic for all customers serviced by the private networking system 140 travels to routers 141 in first tunnels, which may be GRE/IPSec tunnels. Based on the APN and IP address of the sending device, the router 141 determines the appropriate customer enterprise network 10 that the sending device is part of. A second tunnel is then created between the private networking system 140 and the customer enterprise network 10. The private networking system 140 can support a plurality of different customers. The private networking system 140 can also implement policy, unique to each of those customers in the control logic 144.

Having defined a basic architecture which allows simplified creation of a customer private network, this architecture may be used to customize to incorporate various features.

Figure 5:
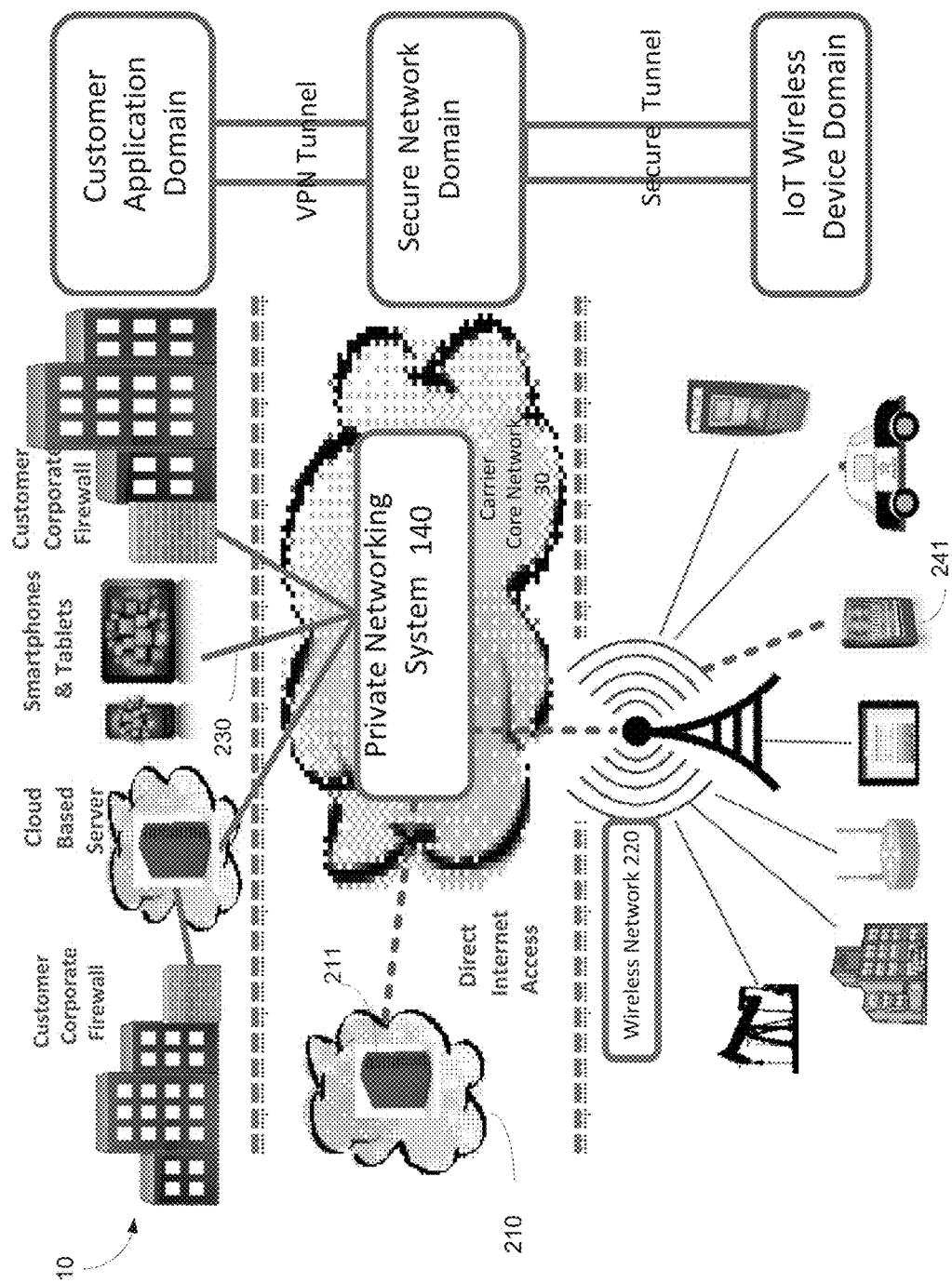
FIG. 5 shows a feature that may be implemented using the architecture of FIG. 4.

For example, FIG. 5 shows a first additional feature.

The unique architecture described herein allows for a direct connection from the private networking system 140 to a device 211 located on the internet, such as for example, an enterprise's update or maintenance server. The dotted lines in FIG. 5 illustrate direct internet access between a wireless device 241 disposed in the wireless network 220, and a device 211 that is disposed on the public internet (i.e. not behind the enterprise firewall).

This solution is enabled by the unique cloud architecture which allows the customer to deploy this device 211 (i.e. an update or maintenance server) on either side of its firewall and allow an external device 241 to gain access to this device 211 without entering the enterprise's secure environment.

This provides the customer with the ability to direct the external device 241 to either side of the firewall and/or to the customer's update servers, if available. In other words, in one embodiment, the update server (i.e. device 211) is located within the customer's enterprise network 10. In this scenario, the external device 241 must use secure tunnels to access the update server. In a second embodiment, the update server is located outside the customer's enterprise network 10. In this embodiment, the external device 241 may access the update server (i.e. device 211) without the need for the same level of security since it never enters the customer's secure environment.

In operation, the external device 241 wakes up and polls the device 211, such as an update server. This session is only initiated by the external device 241. The external device 241 uses a data filled IP address on the device 241 as the address of the device 211.

Referring now to FIG. 3B, the direct internet connection will be explained. If the device 211 is located within the customer enterprise network 10, the flow of data is as described above. If, however, the device 211 is located outside of the customer enterprise network 10, there is no need to use the VPN servers 142. Thus, the router 141 determines that the destination address is outside the customer enterprise network 10, and routes the communication back to the internet 150 through switch 143. In other words, the VPN server 142 is not involved in this transaction when device 211 is outside the customer enterprise network 10.

Figure 6:
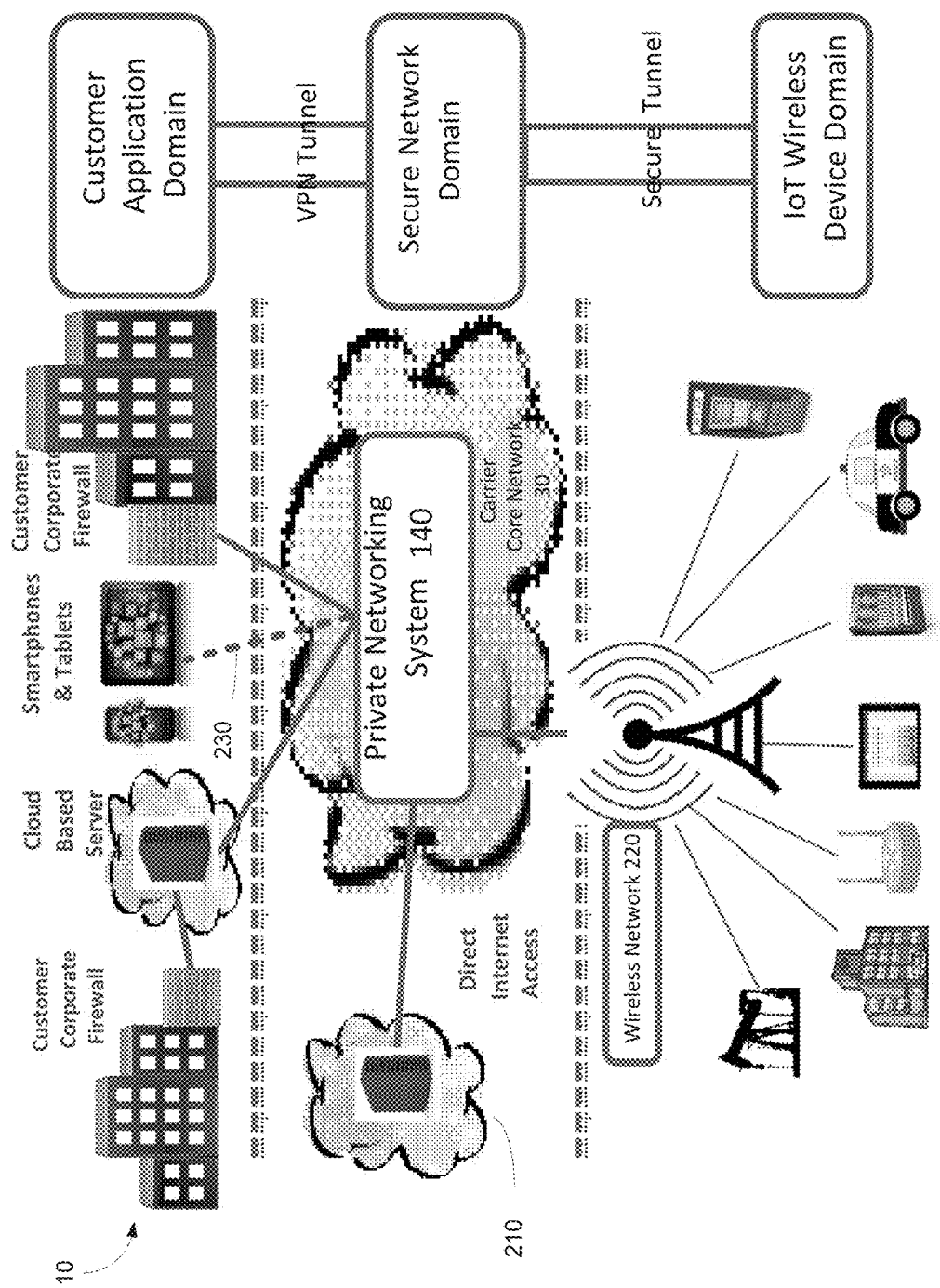
FIG. 6 shows another feature that may be implemented using the architecture of FIG. 4.

FIG. 6 shows a second feature. In this embodiment, different secure tunnels may be established between the customer's enterprise network 10 and the private networking system 140. For example, in certain embodiments, IPSec tunnels are used to link the customer enterprise network 10 and the private networking system 140.

This unique architecture allows for dual secure tunnels to devices when deployed in a cellular network.

This type of deployment may be utilized when an IPsec tunnel is chosen to service the secure data transfer needs while the SSL tunnel is used to dial into a device to check individual devices and their operation. The dotted line in FIG. 6 represents a SSL tunnel from a smartphone to the private networking system 140.

IT groups may use this method when they do not wish to support a secure tunnel from smartphones and tablets back thru the enterprise prior to creating the tunnel to the device.

Thus, the present architecture may be used to support both SSL and IPSec tunnels between devices and the private networking system 140. Referring again to FIG. 3B, this is achieved by using VPN server 142 to create two different types of second tunnels. The type of second tunnel created may be based on the type of device (i.e. PC, smartphone, tablet, server, etc). Of course, other criteria may be used to determine what type of second tunnel should be established.

Figure 7:
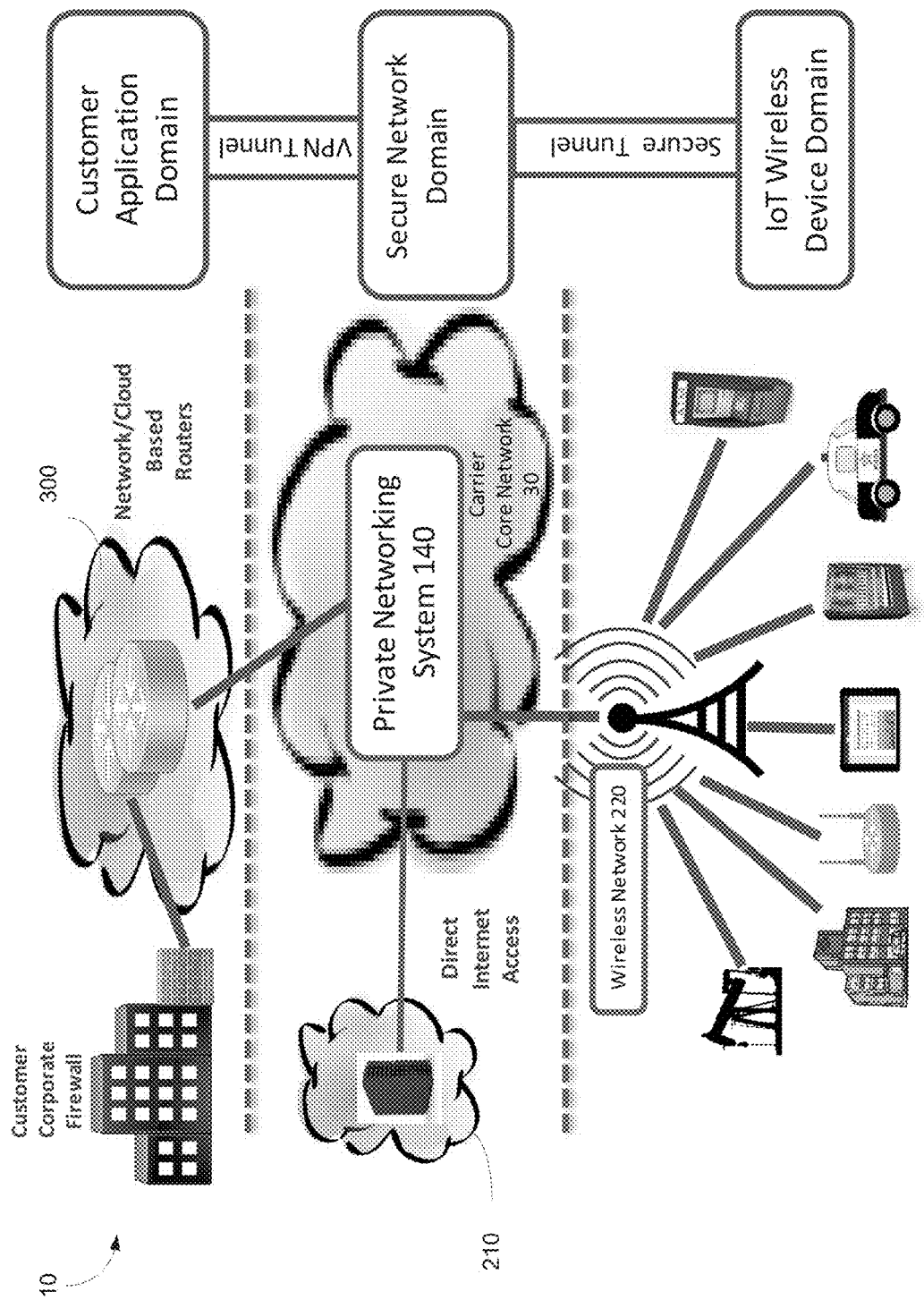
FIG. 7 shows another feature that may be implemented using the architecture of FIG. 4.

FIG. 7 shows another feature. In this embodiment, the customer uses network-based or cloud-based routers. The present architecture allows for a flexible termination strategy from the private networking system 140 back to the customer enterprise network 10.

This type of deployment may be utilized when an IPsec tunnel is chosen to terminate to a set of network or cloud based routers 300 that will initiate an MPLS circuit to the customer enterprise network 10. This may be utilized when the customer IT group only allows MPLS terminations. In this embodiment, the VPN servers 142 create a secure second tunnel to the network or cloud based routers 300. The network or cloud based routers 300 then initiate a MPLS circuit to the customer enterprise network 10. Thus, the present architecture allows the second tunnels, which are created by the VPN servers in the private networking system 140, to be terminated at a variety of different destinations and devices.

Figure 8:
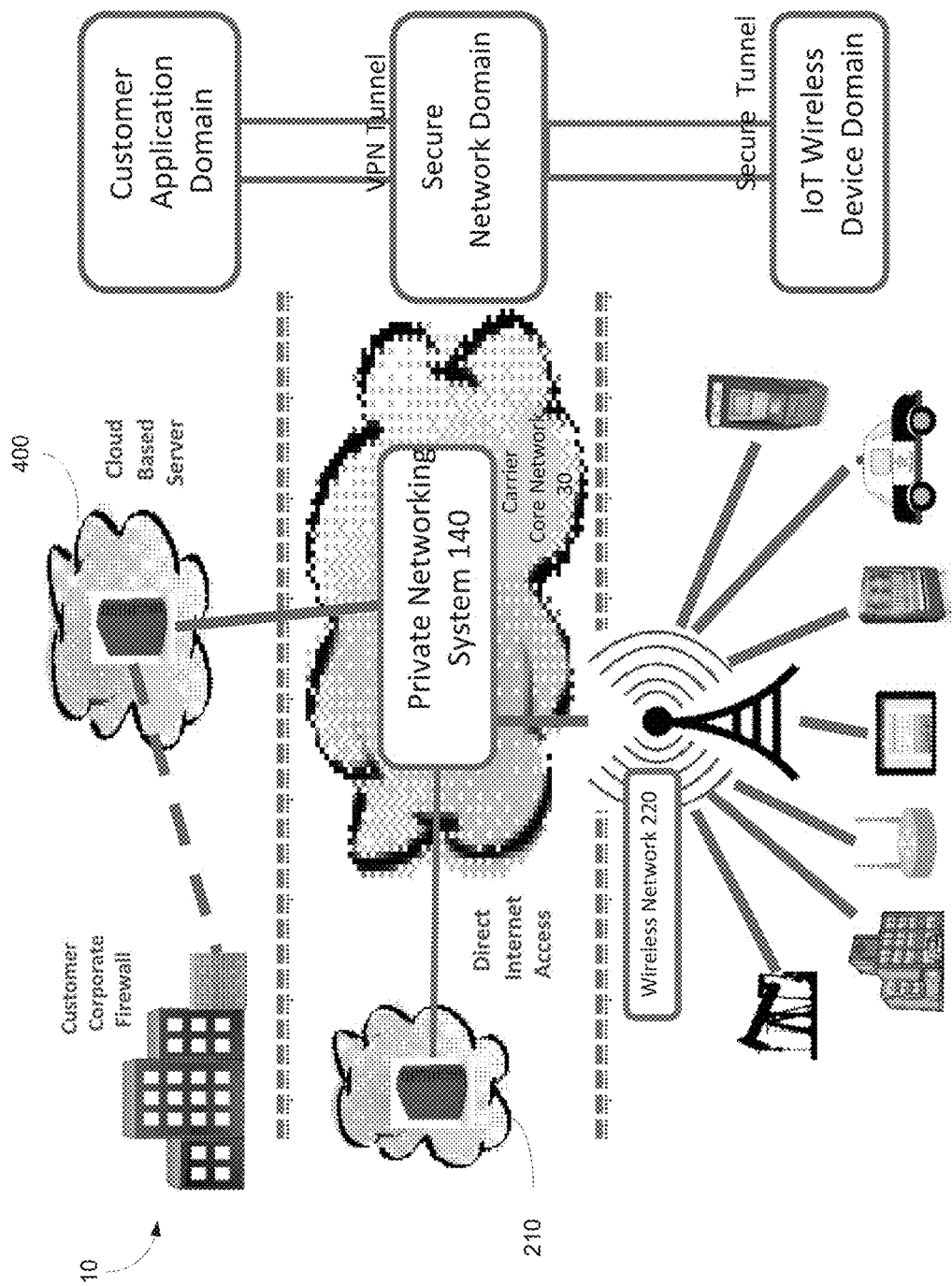
FIG. 8 shows another feature that may be implemented using the architecture of FIG. 4.

FIG. 8 shows another feature. The unique architecture allows for a flexible termination strategy from a cellular network back to the hosting enterprise.

This type of deployment is utilized when an IPsec tunnel is chosen to service the secure data transfer needs to a cloud based server 400 hosted by a third party, that provides hosting services for enterprises IT services. The hosting cloud service will allow dial into the server 400 from the customer enterprise network 10 or the data will be transferred to the customer enterprise network 10 using a separate method. Thus, as also shown in FIG. 7, this present architecture allows the second tunnels to be terminated at various destinations and devices.

Figure 9:
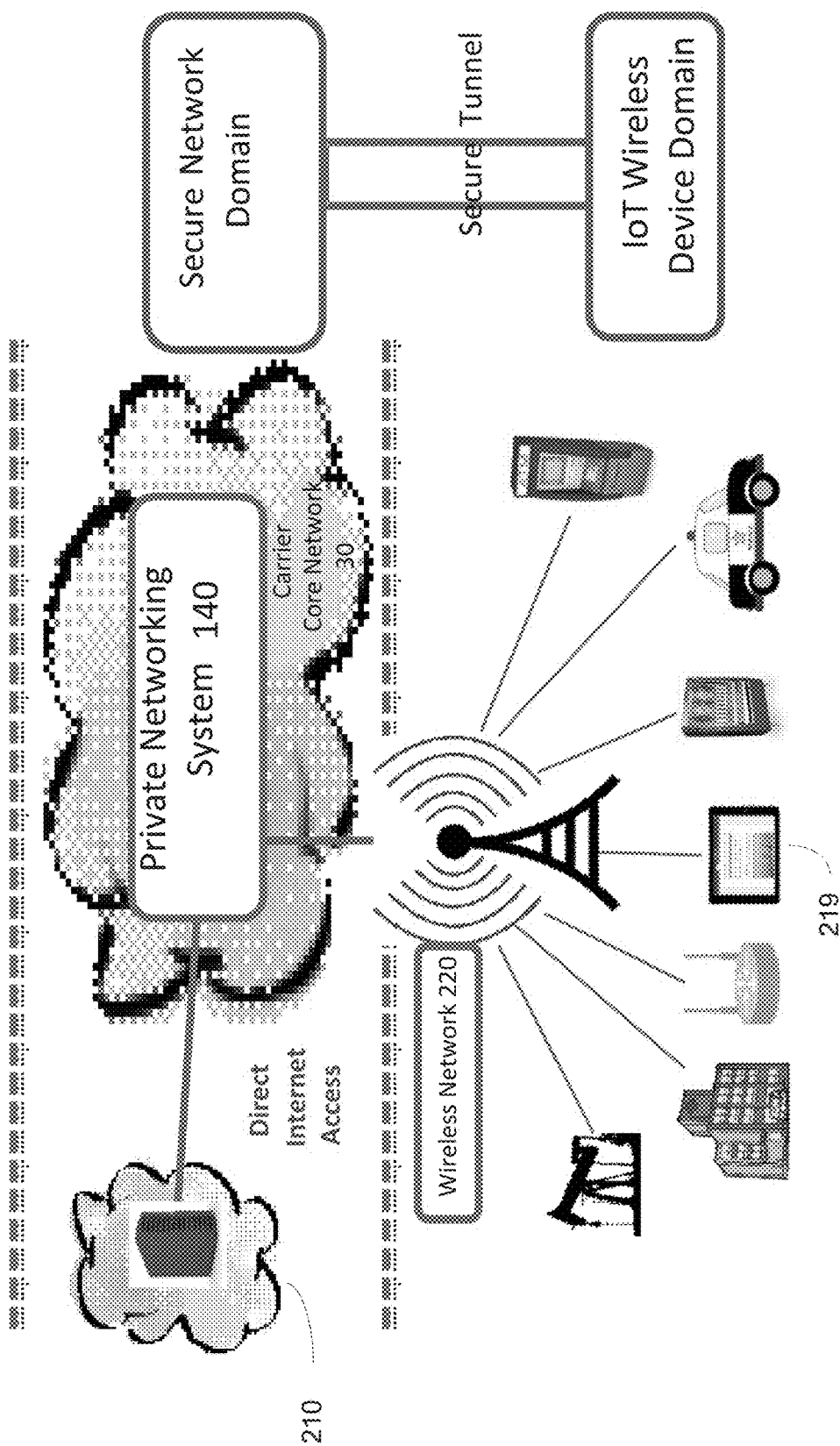
FIG. 9 shows another feature that may be implemented using the architecture of FIG. 4.

FIG. 9 shows another feature. FIG. 9 is similar to FIG. 4, but lacks a customer enterprise network. In this embodiment, devices 219 in the wireless network 220 are not able to access a customer enterprise network. Rather, the devices 219 may be able to access the internet 210, via the private networking system 140. Like the previous embodiments, the devices 219 may be assigned an IP address, which may be a private static IP address. Based on this IP address and the APN, communications from the device 219 are routed to the router 141 in the private networking system 140. As before, the router 141 terminates the first tunnel that originated in the carrier wireless network 220. Based on the IP address, the router 141 is able to determine that this device 219 is not authorized to access a customer enterprise network. However, the device 219 may be permitted to access the internet 210. As described earlier, the router 141 may have the ability to implement policy decisions. For example, the amount of data that the device 219 is able to transmit may be limited by the router 141 in the private networking system 140. In certain embodiments, the router 141 may be able to limit or block certain activities, such as high definition (HD) video streaming. In certain embodiments, certain websites may be blocked by the policy implemented by the private networking system 140.

This embodiment allows enterprises to offer WiFi services, such as hot spots, while maintain some amount of control over the data usage and visited websites. As an example, a library may offer free WiFi services. To limit the amount of data that patrons use, the library may implement a set of policies in the private networking system 140, that restrict data usage, such as by prohibiting certain activities, like HD video playback. The library may also implement policies that prohibit patrons from accessing certain websites, which the library has determined to be inappropriate. Of course, other embodiments are also possible.

Thus, in this embodiment, the private networking system 140 is not providing a pathway to a customer enterprise network. Rather, the private networking system 140 is used to implement a set of policies for a customer. Multiple customers may utilize this embodiment, each with its own set of policies.

Figure 10:
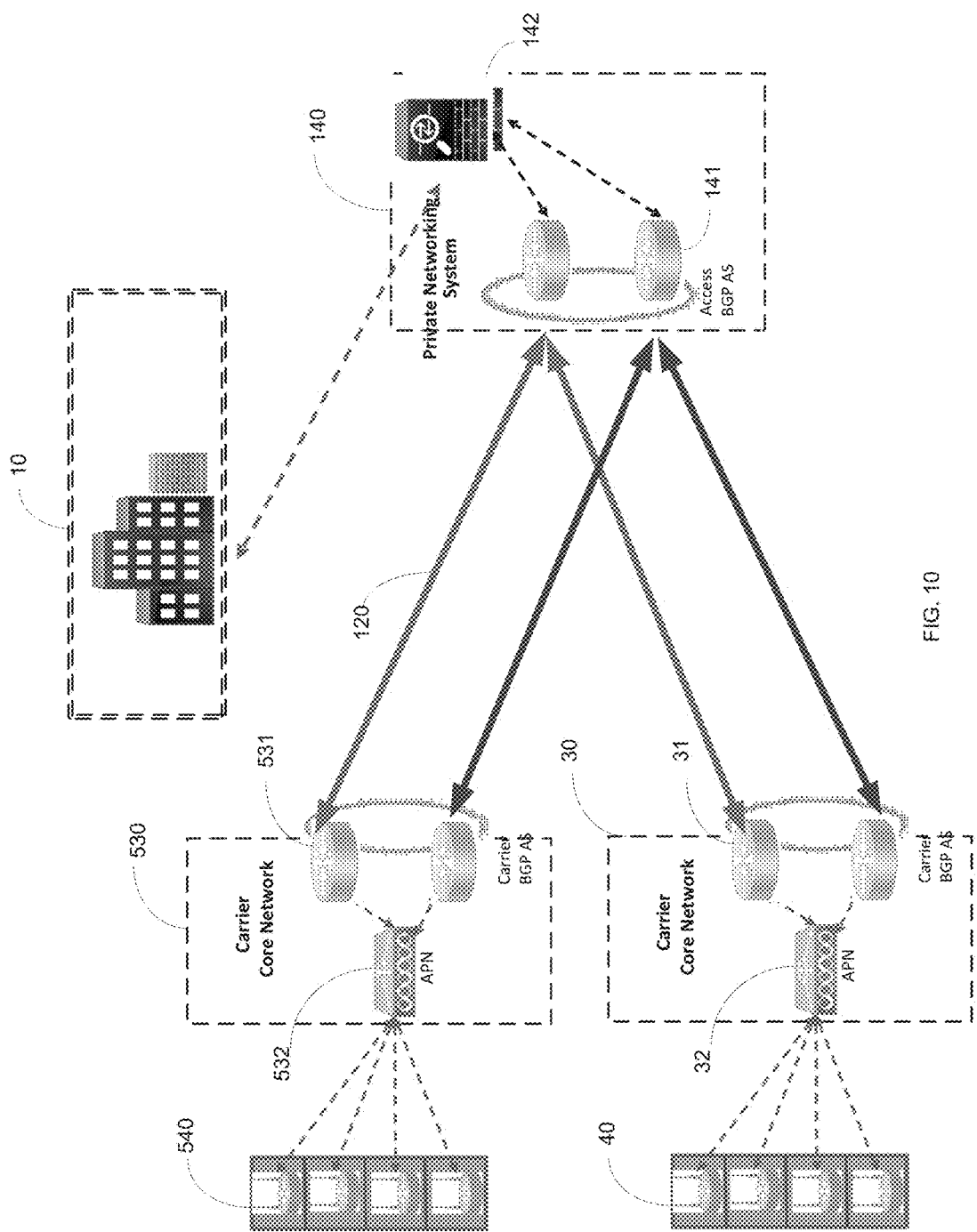
FIG. 10 shows the private networking system in communication with two carrier networks.

FIG. 10 shows another feature of the present architecture. Previously, all figures illustrated the connection between the private networking system 140 and a carrier network 30. However, the disclosure is not limited to this embodiment. FIG. 10 shows a first customer subnet 40, in communication with a first carrier network 30, much like the previous figures. As before, the carrier network 30 communicates with routers 141, which may be BPG routers, in the private networking system, which terminate the first tunnels. However, FIG. 10 also shows a second customer subnet 540, in communication with a second carrier network 530. Like the first carrier network 30, the first tunnel originating from the second carrier network 530 is terminated at the routers 141 in the private networking system 140.

In certain embodiments, the first carrier network 30 and the second carrier network 530 may be from different providers, such as AT&T, Verizon, Sprint, T-Mobile, etc. Thus, the first carrier network 30 may be from a first provider, while the second carrier network 530 may be from a second provider.

In other embodiments, the first carrier network and the second carrier network may be from the same provider. For example, the second subnet 540 may be designated to a gateway 532 having a different APN than the first subnet 40. In one example, the first carrier network 30, first subnet 40, the APN and gateway 32 is provided directly by a carrier. The second gateway 530, the second subnet 540 and the second APN are provided by a partner of that carrier, which is authorized to utilize the core network of the carrier.

Thus, the private networking system is able to connect to various carrier networks, as well as to various customer enterprise networks. By being disposed between the carrier networks and the customer enterprise networks, the private networking system is also to offer a plurality of features and benefits. Further, the private networking system offers ease and convenience that are not previously available to customers wishing to implement private subnets.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A private networking system to connect devices operating on a carrier network to a customer enterprise network, comprising:
    a router to terminate a first tunnel originating on the carrier network; and
    a VPN server to create a second tunnel which is terminated at the customer enterprise network,
    wherein the router and the VPN server are in communication with one another, and wherein the private networking system is not part of the carrier network nor part of the customer enterprise network.

2. The private networking system of claim 1, wherein the VPN server is adapted to create a plurality of second tunnels which are respectively terminated at a plurality of different customer enterprise networks.

3. The private networking system of claim 1, wherein connections to the carrier network are via the internet.

4. The private networking system of claim 1, wherein connections to the customer enterprise network are via the internet.

5. The private networking system of claim 1, further comprising control logic to set policy for communications occurring on the customer enterprise network.

6. The private networking system of claim 1, wherein the second tunnel comprises an IPSec or SSL tunnel.

7. The private networking system of claim 1, wherein the router comprises a BGP router, and the first tunnel originates at a second BGP router disposed in the carrier network.

8. The private networking system of claim 1, wherein each mobile device in the carrier network has an IP address and the IP address is used to determine data to be transmitted through the first tunnel.

9. A communication system, comprising:
    a carrier network;
    a customer enterprise network; and
    a private networking system disposed between the carrier network and the customer enterprise network, wherein the private networking system terminates a first tunnel that originates in the carrier network and creates a second tunnel that terminates in the customer enterprise network.

10. The communications system of claim 9, wherein the first tunnel is terminated by a router disposed in the private networking system.

11. The communications system of claim 10, wherein the router comprises a BGP router, and carrier network comprises a second BGP router, and wherein the first tunnel originates at the second BGP router disposed in the carrier network.

12. The communication system of claim 9, wherein the second tunnel is created by a VPN server disposed in the private networking system.

13. The communication system of claim 9, further comprising a second customer enterprise network, wherein the private networking system creates a second tunnel to the second customer enterprise network.

14. The communication system of claim 13, wherein a mobile device in the carrier network has an IP address and the IP address is used by the private networking system to determine which customer enterprise network the mobile device is authorized to access.

15. The communication system of claim 9, further comprising a second carrier network, wherein the private networking system terminates a first tunnel originating in the second carrier network.

16. The communication system of claim 9, wherein each mobile device in the carrier network has an IP address and the IP address is used to determine data to be transmitted through the first tunnel.

* * * * *